June 15, 1937. J. H. POOLE 2,083,743
PARACHUTE
Filed March 7, 1936
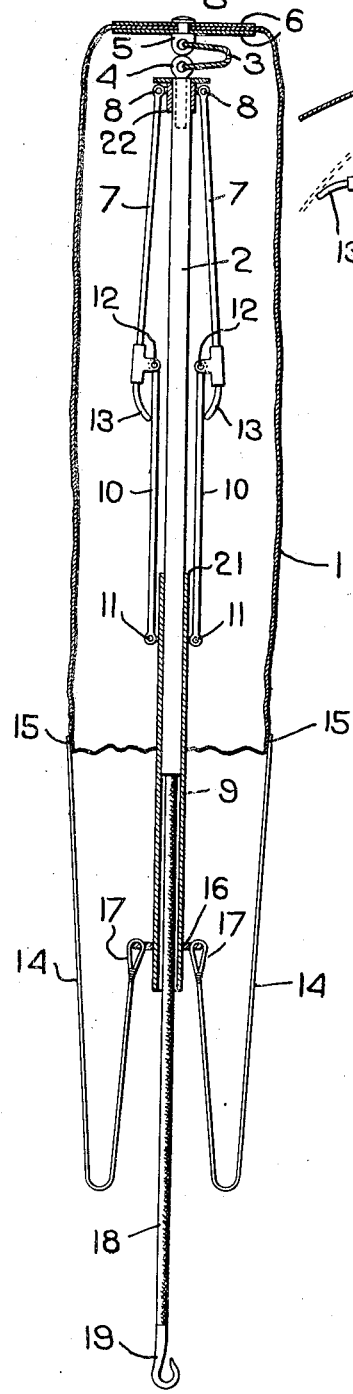
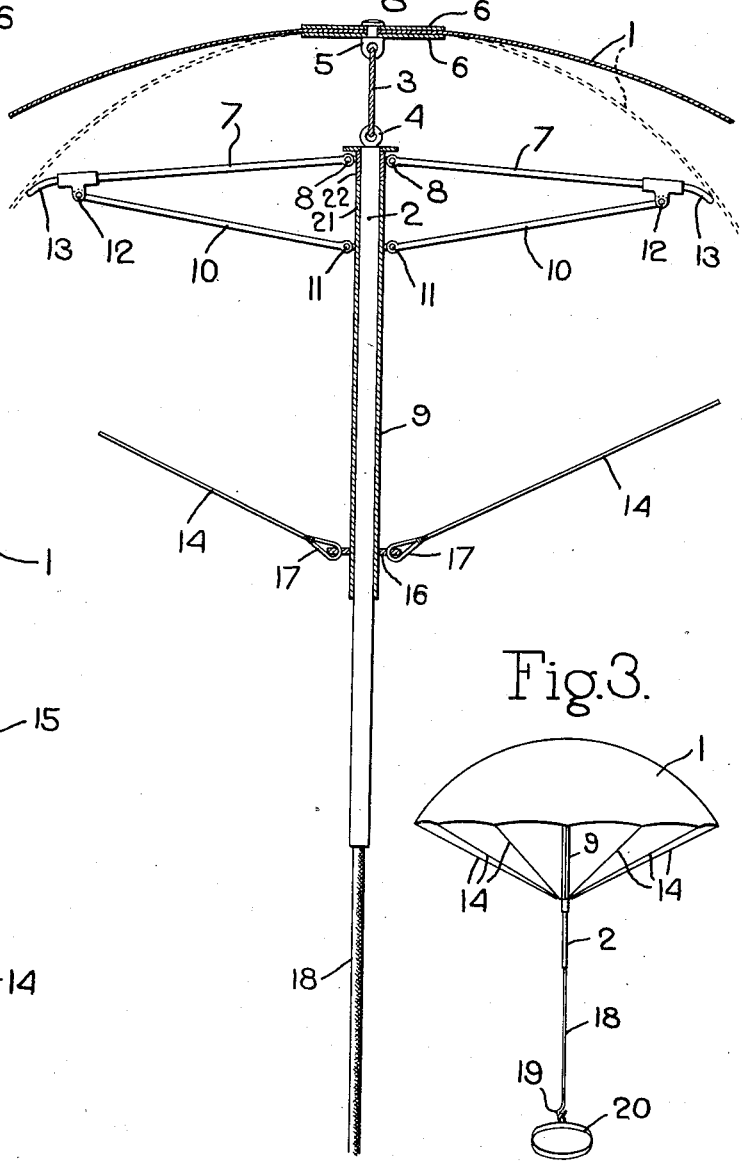
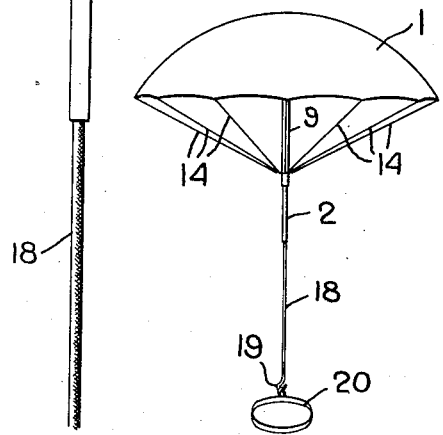
Inventor.
John H. Poole
by Heard Smith & Tennant.
Attys.

Patented June 15, 1937

2,083,743

UNITED STATES PATENT OFFICE 2,083,743

PARACHUTE

John H. Poole, Brockton, Mass., assignor to George D. Witherell, Abington, Mass., trustee Application March 7, 1936, Serial No. 67,619

1 Claim. (Cl. 244—149)

This invention relates to parachutes and particularly to a device for opening the parachute after the parachute jumper or aviator has left a balloon or airplane from which he has "bailed out".

One object of the invention is to provide a simple but efficient device for mechanically opening the parachute which can be easily operated and which will insure the proper opening of the parachute under all conditions.

In order to give an understanding of the invention I have illustrated in the drawing some selected embodiments thereof which will now be described, after which the novel features will be pointed out in the appended claim.

In the drawing:

Fig. 1 is a sectional view showing a parachute in folded condition with the opening device within the parachute cover also in folded condition.

Fig. 2 is a fragmentary view showing the parachute opened.

Fig. 3 is a view on a small scale showing the parachute completely opened.

In the drawing 1 indicates the parachute cover or envelope which may be made of any suitable material.

The parachute-opening device comprises a central rod 2 which is connected at its upper end to the center of the parachute cover 1 by means of a cord or other flexible connection 3. For this purpose the upper end of the rod 2 is shown as having an eye 4 to which one end of the cord 3 is secured, the other end of the cord being secured to an eye 5 attached to the cover 1. In order to strength the connection between the cord 3 and cover 1 there is provided two metal disks 6 located on opposite sides of the cover and to which the eye 5 is rivetted.

7 indicate parachute-opening arms which are pivoted at their inner ends to the upper end of the rod 2, as shown at 8. Slidable on the rod 2 is an elongated sleeve 9 and pivoted at 11 to the upper end of the sleeve are a plurality of braces 10, there being one brace for each arm 7 and the outer end of each brace being pivoted to the corresponding arm 7 near its outer end, as shown at 12. The outer ends of the arms 7 preferably project slightly beyond the pivot point 12 and are curved downwardly slightly as indicated at 13.

14 indicate guy ropes or cords which are fastened at their outer ends to the periphery of the envelope 1, as shown at 15, and at their inner ends said ropes are secured to the lower end of the sleeve 9. For this purpose the sleeve 9 has a flange 16 provided with openings to receive loops 17 formed in the inner ends of the guy connections 14. The rod 2 has a cord or rope 18 secured to its end, said rope having at its end a hook 19 or other fastening device adapted to be secured to the belt 20 or harness of the user of the parachute.

When the parachute is folded, as shown in Fig. 1, the opening device is also folded and is enclosed by the folded cover 1.

When the parachute is to be used the hook or other fastening device 19 of the cord 18 is secured to the belt or harness 20 of the aviator, and as he leaves the balloon or airplane the pull or strain applied to the cord 18 will draw the rod 2 downwardly through the sleeve 9, thereby spreading the arms 7, as shown in Fig. 2. This spreading of the arms 7 will partially open the parachute cover 1, and as soon as it is thus partially opened the air resistance will complete the opening movement. Because of the flexible connection 3 between the rod 1 and the parachute cover the center portion of the parachute will be spaced a distance from the rod, and the cover 1, when fully expanded, will thus be separated from the expanded frame 7, 10. When the parachute is opened, therefore, it will function in the same way that a parachute does which is not equipped with any opening device of this type.

The device is simple in construction but is positive in operation.

The sleeve 9 extends above the pivotal connection 11 of the braces 10, as shown at 21, and when the opening device is fully expanded the upper end 21 of the sleeve engages the collar 22 at the upper end of the rod 2 to which the arms 7 are pivoted. With this construction the weight of the aviator is transmitted through the rod 2 to the sleeve 9 and thence to the guy ropes 14.

I claim:

A parachute comprising a parachute canopy and a parachute-opening device comprising a rod having a collar fixed thereto at its upper end, parachute-opening arms pivoted to the collar, said arms having considerably less length than the radius of the parachute cover and being unattached thereto, an elongated sleeve through which the rod telescopes, braces pivoted at their inner ends to the sleeve and at their outer ends to said arms, flexible guy connections secured at their inner ends to the lower end of the sleeve and at their outer ends to the periphery of the canopy, a flexible cord connecting the upper end of the rod with the center of the parachute cover, and a cord connected to the lower end of the rod and having at its end a fastening device for attachment to the belt or harness of the parachute jumper, the upper end of the sleeve engaging the collar when the parachute-opening device is expanded whereby the weight of the aviator is transmitted to the guy connections through the rod and the sleeve.

JOHN H. POOLE.